(12) United States Patent
Orr et al.

(10) Patent No.: US 10,294,739 B2
(45) Date of Patent: May 21, 2019

(54) LOWER STABILIZING ARM FOR A DRILLING RIG

(71) Applicant: Schlumberger Technology Corporation, Sugar Land, TX (US)

(72) Inventors: Melvin Alan Orr, Tulsa, OK (US); Joe Rodney Berry, Cypress, TX (US); Robert Metz, Cypress, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/309,825

(22) PCT Filed: Nov. 8, 2016

(86) PCT No.: PCT/US2016/060885
§ 371 (c)(1),
(2) Date: Nov. 9, 2016

(87) PCT Pub. No.: WO2017/087200
PCT Pub. Date: May 26, 2017

(65) Prior Publication Data
US 2017/0268302 A1    Sep. 21, 2017

Related U.S. Application Data

(60) Provisional application No. 62/255,991, filed on Nov. 16, 2015.

(51) Int. Cl.
*E21B 19/14* (2006.01)
*E21B 19/24* (2006.01)
*F16L 1/20* (2006.01)

(52) U.S. Cl.
CPC ............. *E21B 19/24* (2013.01); *F16L 1/207* (2013.01)

(58) Field of Classification Search
CPC ........... Y10T 29/49778; Y10T 29/4978; Y10T 408/91; Y10T 408/935; Y10T 74/20305;
(Continued)

(56) References Cited

U.S. PATENT DOCUMENTS 1,884,874 A * 10/1932 Ross .................. E21B 19/14
166/77.51
2,690,847 A * 10/1954 Crookston .............. E21B 19/14
175/85
(Continued)

FOREIGN PATENT DOCUMENTS

CN      104314480 A  *  1/2015  ........... E21B 17/057
SU      1162963 A2       6/1985
(Continued)

OTHER PUBLICATIONS

International Search Report and Written Opinion issued in International Patent Appl. No. PCT/US2016/060885 dated Feb. 27, 2017; 14 pages.

*Primary Examiner* — Gregory W Adams
(74) *Attorney, Agent, or Firm* — Rachel E. Greene (57) ABSTRACT

A lower stabilizing arm for stabilizing tubulars for stabbing to the threaded connections of a drill string on drilling rigs. The lower stabilizing arm comprises a bracket and an upper arm having an upper end and a lower end. An upper pair of axially opposed rotary actuators connects the upper end of the upper arm to the bracket. A lower arm is provided having an upper end and a lower end. A central rotary actuator is connected between the lower end of the upper arm and the upper end of the lower arm. A roller bracket is provided having a pair of v-shaped rollers mounted on the roller bracket. A lower pair of axially opposed rotary actuators connects the second end of the lower arm to the roller bracket.

9 Claims, 10 Drawing Sheets

(58) Field of Classification Search
CPC ............... Y10T 74/20311; Y10T 4/20329; B25J 9/102; B25J 9/08; B25J 3/04; B25J 9/046; B25J 19/002; B25J 9/0018; B25J 9/04; E21B 19/14; E21B 19/155; E21B 19/20; E21B 19/16; E21B 19/165; E21B 19/24; E21B 19/146; E21B 19/08; E21B 19/087; E21B 19/00; E21B 19/06; Y10S 414/13; G05B 2219/34403
See application file for complete search history.

(56) References Cited

U.S. PATENT DOCUMENTS

| | | | | |
|---|---|---|---|---|
| 3,370,213 A * | 2/1968 | Rose | ............. | B25J 13/082 294/106 |
| 3,904,042 A | 9/1975 | Colston | | |
| 3,922,930 A * | 12/1975 | Fletcher | ............. | B25J 17/0283 414/738 |
| 4,077,525 A * | 3/1978 | Callegari | ............. | E21B 19/14 175/85 |
| 4,172,684 A * | 10/1979 | Jenkins | ............. | E21B 19/14 175/85 |
| 4,274,778 A * | 6/1981 | Putnam | ............. | B25J 9/0084 175/85 |
| 4,397,605 A * | 8/1983 | Cowgill | ............. | B25J 9/102 294/116 |
| 4,440,536 A * | 4/1984 | Scaggs | ............. | E21B 19/20 175/85 |
| 4,582,133 A * | 4/1986 | Tambs | ............. | E21B 19/20 166/77.51 |
| 4,643,624 A * | 2/1987 | Murphree | ............. | E21B 19/14 175/85 |
| 7,331,746 B2 * | 2/2008 | Wright | ............. | E21B 19/20 414/22.65 |
| 7,431,550 B2 * | 10/2008 | Thompson | ............. | F16L 1/06 175/85 |
| 7,540,338 B2 * | 6/2009 | Belik | ............. | E21B 19/155 175/52 |
| 7,552,775 B2 * | 6/2009 | Pietras | ............. | E21B 19/155 166/380 |
| 7,841,415 B2 * | 11/2010 | Winter | ............. | E21B 19/16 166/382 |
| 7,967,540 B2 * | 6/2011 | Wright | ............. | E21B 19/20 166/377 |
| 8,028,748 B2 * | 10/2011 | Laitolais, Jr. | ............. | E21B 19/24 166/77.51 |
| 8,186,926 B2 * | 5/2012 | Littlely | ............. | E21B 19/155 33/366.24 |
| 8,839,881 B1 * | 9/2014 | Baumler | ............. | E21B 19/155 175/85 |
| 2007/0251728 A1 | 11/2007 | Belik | | |
| 2011/0103922 A1 | 5/2011 | Belik | | |
| 2011/0108265 A1 | 5/2011 | Ge | | |
| 2012/0011956 A1 * | 1/2012 | Lundberg | ............. | B25J 9/04 74/490.03 |
| 2014/0138080 A1 * | 5/2014 | Yorga | ............. | E21B 19/14 166/77.51 |
| 2014/0209382 A1 | 7/2014 | Smith et al. | | |

FOREIGN PATENT DOCUMENTS

| | | | | |
|---|---|---|---|---|
| WO | WO 2009065124 A1 * | 5/2009 | ............. | E21B 19/24 |
| WO | 2014179727 A1 | 11/2014 | | |

* cited by examiner

LOWER STABILIZING ARM FOR A DRILLING RIG

CROSS REFERENCE TO RELATED APPLICATIONS

This application is a National Stage application of International Application No. PCT/US2016/060885 filed Nov. 8, 2016, which claims priority to U.S. Provisional Patent Application Ser. No. 62/255,991, filed Nov. 16, 2015, and having the same title. Both patent applications are incorporated by reference herein in their entirety.

BACKGROUND

In the exploration of oil, gas and geothermal energy, drilling operations are used to create boreholes, or wells, in the earth. Conventional drilling involves having a drill bit on the bottom of the well. A bottom-hole assembly is located immediately above the drill bit where directional sensors and communications equipment, batteries, mud motors, and stabilizing equipment are provided to help guide the drill bit to the desired subterranean target.

A set of drill collars are located above the bottom-hole assembly to provide a non-collapsible source of weight to help the drill bit crush the formation. Heavy weight drill pipe is located immediately above the drill collars for safety. The remainder of the drill string is mostly drill pipe, designed to operate under tension. A conventional drill pipe section is about 30 feet long, but lengths vary based on style. It is common to store lengths of drill pipe in "doubles" (2 connected lengths) or "triples" (3 connected lengths). When the drill string (drill pipe, drill collars and other components) are removed from the wellbore to change-out the worn drill bit, the drill pipe and drill collars are set back in doubles or triples until the drill bit is retrieved and exchanged. This process of pulling everything out of the hole and running it all back in is known as "tripping."

Tripping is non-drilling time and, therefore, an expense. Efforts have long been made to devise ways to avoid it or at least speed it up. Running triples is faster than running doubles because it reduces the number of threaded connections to be disconnected and then reconnected. Triples are longer and therefore more difficult to handle due to their length and weight and the natural waveforms that occur when moving them around. Manually handling moving pipe at the drill floor level can be dangerous.

It is desirable to have a drilling rig with the capability to reduce the trip time. One element of high speed trip rates that remains an obstacle is the handling of long lengths of thin tubulars assembled in stand lengths and, in particular, drill pipe. To maintain safety when accelerating trip rates, it is indicated to remove personnel from the drill floor and automate the handling of stand lengths of tubulars. The faster things happen around the wellbore, the more dangerous it is to have personnel on the drill floor. Additionally, faster movement of stand lengths of pipe creates greater harmonics in the stand, which are influenced by the increased acceleration. Accelerated movement of the lower end of a stand length also increases the momentum of the stand length, and the force that will be imparted when it impacts anything or anyone on the drill floor.

Therefore, it is desirable to have a drill floor mounted manipulating arm that is capable of stabilizing and guiding the lower end of a variety of drilling tubulars that are series connected in "stand" lengths of doubles, triples, or fourables. It is further desirable to have such a drill floor mounted manipulating arm that is capable of stabilizing and guiding the lower end of the tubulars to multiple locations proximate to the drill floor such that the guide can be used for multiple functions involving the tubulars.

SUMMARY

The disclosed subject matter of the application relates to a lower stabilizing arm that assists in stabilizing tubulars for positioning stand lengths of drill pipe and collars, and guidance for stabbing to threaded connections of a drill string on drilling rigs. The lower stabilizing arm reduces the need for manual manipulation of the lower end of a hoisted tubular, and the time needed for tripping of drill string. The lower stabilizing arm is connected to the mast portion of a drilling rig, proximate to the drill floor.

In one embodiment, a lower stabilizing arm for a drilling rig is provided comprising a bracket and an upper arm having an upper end and a lower end. An upper pair of axially opposed rotary actuators connects the upper end of the upper arm to the bracket. A lower arm is provided having an upper end and a lower end. A central rotary actuator is connected between the lower end of the upper arm and the upper end of the lower arm. A roller bracket is provided having a pair of v-shaped rollers mounted on the roller bracket. A lower pair of axially opposed rotary actuators connects the second end of the lower arm to the roller bracket. In another embodiment, the lower stabilizing arm has an obtuse angular bend disposed on the lower arm.

In another embodiment, a lower stabilizing arm is provided with a series of five rotational actuators located on the length of the stabilizing arm. A roller bracket is located on a distal end of the arm, and a pair of rollers is mounted on the roller bracket. In another embodiment, there is also an obtuse angular bend disposed on the lower arm.

In another embodiment, a lower stabilizing arm is provided with a bracket and an upper arm having an upper end and a lower end. A first rotary actuator is mounted on the bracket. A first actuator coupling connects the first rotary actuator to a second rotary actuator between the upper end of the upper arm and the bracket. A lower arm is provided, having an upper end and a lower end. A third rotary actuator is connected between the lower end of the upper arm and the upper end of the lower arm. A fourth rotary actuator is connected to the lower end of the lower arm. A second actuator coupling connects the fourth rotary actuator to a fifth rotary actuator. A roller bracket is connected to the fifth rotary actuator. A pair of v-shaped rollers is mounted on the roller bracket.

As will be understood by one of ordinary skill in the art, the assembly disclosed may be modified and the same advantageous result obtained. It will also be understood that as described, the mechanism can be operated in reverse to remove drill stand lengths of a drill string from a wellbore for orderly bridge crane stacking.

The objects and features of the disclosed embodiments will become more readily understood from the following detailed description and appended claims when read in conjunction with the accompanying drawings in which like numerals represent like elements.

The drawings constitute a part of this specification and include exemplary embodiments which may be embodied in various forms. It is to be understood that in some instances various aspects of the disclosed embodiments may be shown exaggerated or enlarged to facilitate an understanding of the principles and features of the disclosed embodiments.

DETAILED DESCRIPTION

The following description is presented to enable any person skilled in the art to make and use the lower stabilizing arm, and is provided in the context of a particular application and its requirements. Various modifications to the disclosed embodiments will be readily apparent to those skilled in the art, and the general principles defined herein may be applied to other embodiments and applications without departing from their spirit and scope. Thus, the disclosure is not intended to be limited to the embodiments shown, but is to be accorded the widest scope consistent with the embodiments disclosed herein.

Figure 1:
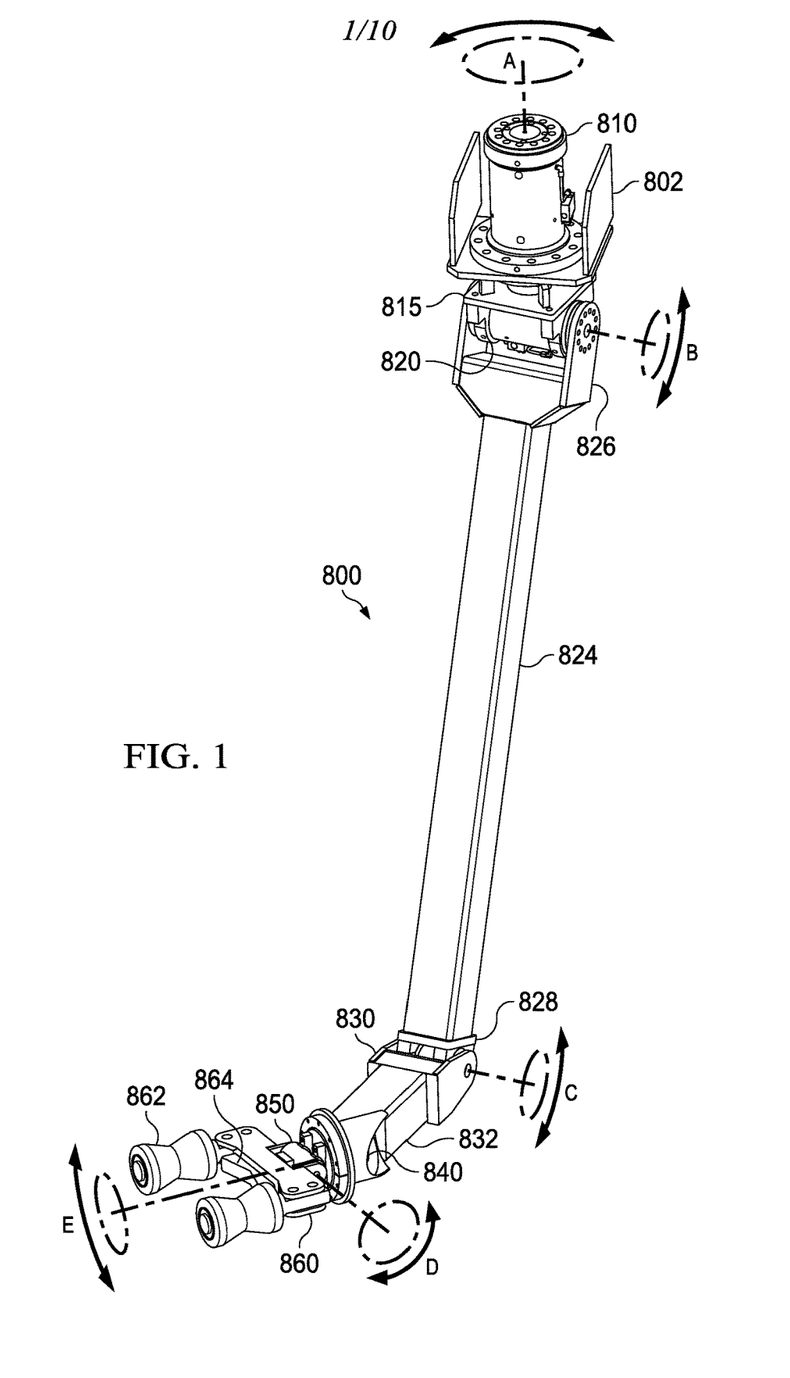
FIG. 1 is an isometric view of an embodiment of a lower stabilizing arm, illustrating the multiple axis of rotation of the arm.

FIG. 1 is an isometric view of an embodiment of a lower stabilizing arm 800, illustrating the multiple axis of rotation of its arm 824. In this view it is seen that five axes of rotation are combined to obtain all of the movement of lower stabilizing arm 800 to accomplish its purpose of stabilizing a lower end of a drill pipe stand 2 (see FIG. 9) without requiring a liner extension.

Figure 2:
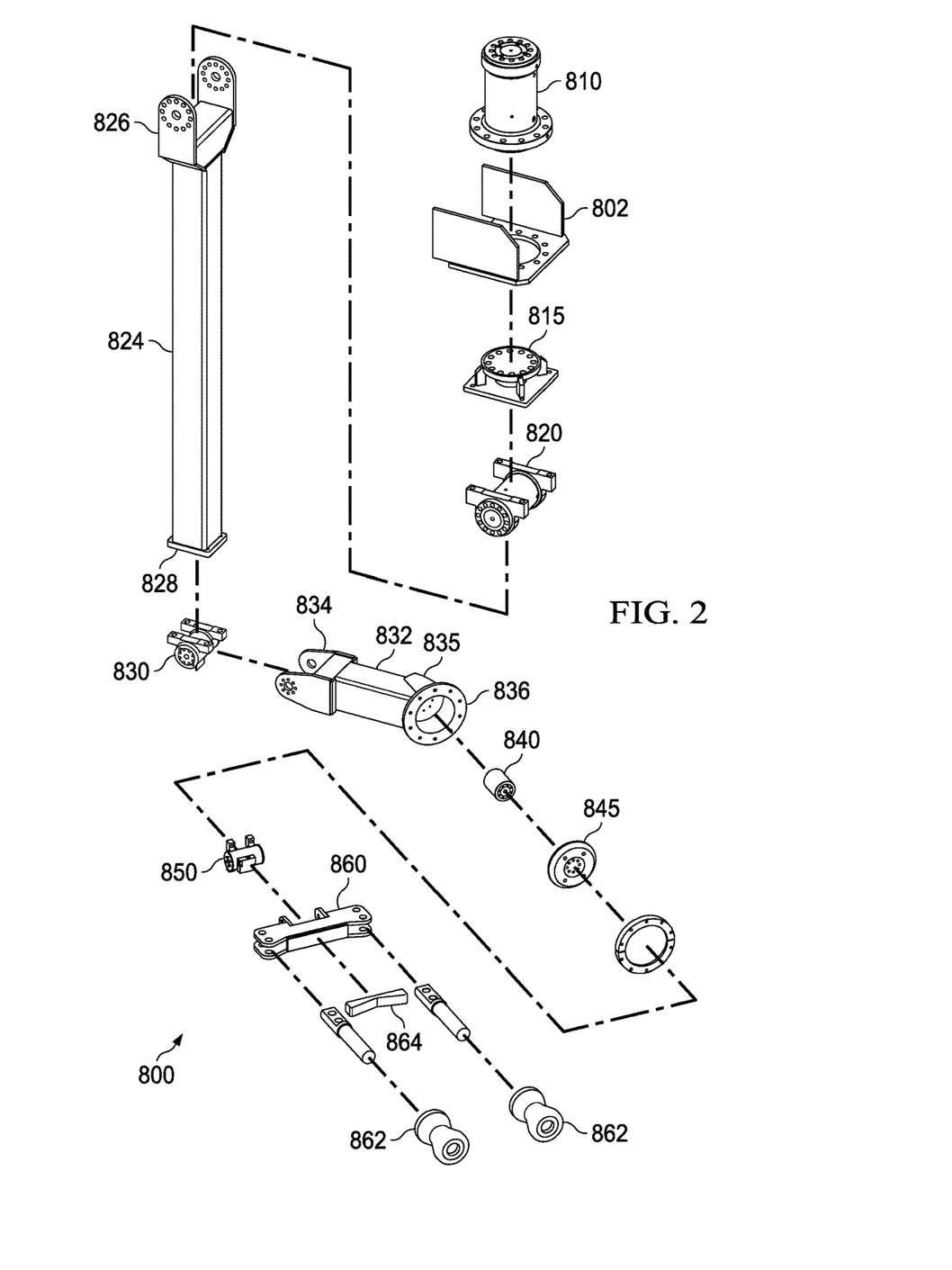
FIG. 2 is an isometric exploded view of the embodiment of the lower stabilizing arm shown in FIG. 1.

FIG. 2 is an isometric exploded view of an embodiment of lower stabilizing arm 800. As seen in FIG. 2, lower stabilizing arm 800 has a first rotary actuator 810 mounted to a mast bracket 802. A first actuator coupling 815 connects first rotary actuator 810 to a second rotary actuator 820. An upper arm 824 is provided having an upper end 826 and a lower end 828. Upper end 826 is connected to second rotary actuator 820. A third rotary actuator 830 is connected to the lower end 828 of upper arm 824.

A lower arm 832 is provided, having an upper end 834 and an opposite lower end 836. Upper end 834 of lower arm 832 is connected to third rotary actuator 830. An obtuse bend 835 is provided between upper end 834 and lower end 836. Obtuse bend 835 or lower arm 832 permits presentation of a bumper 864 and v shaped rollers 862 perpendicular to the travel of drill pipe 2 when lifted vertically off of the catwalk.

A fourth rotary actuator 840 is connected to lower end 836 of lower arm 832. A second actuator coupling 845 is connected between fourth rotary actuator 840 and a fifth rotary actuator 850. A roller bracket 860 is connected to the fifth rotary actuator 850. A pair of v-shaped rollers 862 is mounted on roller bracket 860.

In the manner described above, first rotary actuator 810 and second rotary actuator 820 form an upper pair of axially opposed rotary actuators (810, 820) connecting the upper end 826 of upper arm 824 to bracket 802. Similarly, fourth rotary actuator 840 and a fifth rotary actuator 850 form a lower pair of axially opposed rotary actuators (840, 850) connecting the lower end 836 of lower arm 832 to roller bracket 860.

Referring back to FIG. 1, operation of first rotary actuator 810 rotates upper arm 824 about axis A. Operation of second rotary actuator 820 rotates upper arm 824 about axis B. Operation of third rotary actuator 830 rotates lower arm 832 about axis C. The operation of first rotary actuator 810, second rotary actuator 820, and third rotary actuator 830 is sufficient to position v-shaped rollers 862 over the respective centers of a wellbore 30, a mousehole 40, and a stand hand-off position 50 of a drilling rig as seen best in FIGS. 6 and 7. As also seen in FIGS. 6 and 7, lower stabilizing arm 800 can reach a catwalk position 60 for receiving the lower end of a drill pipe 2 from a catwalk.

Figure 3:
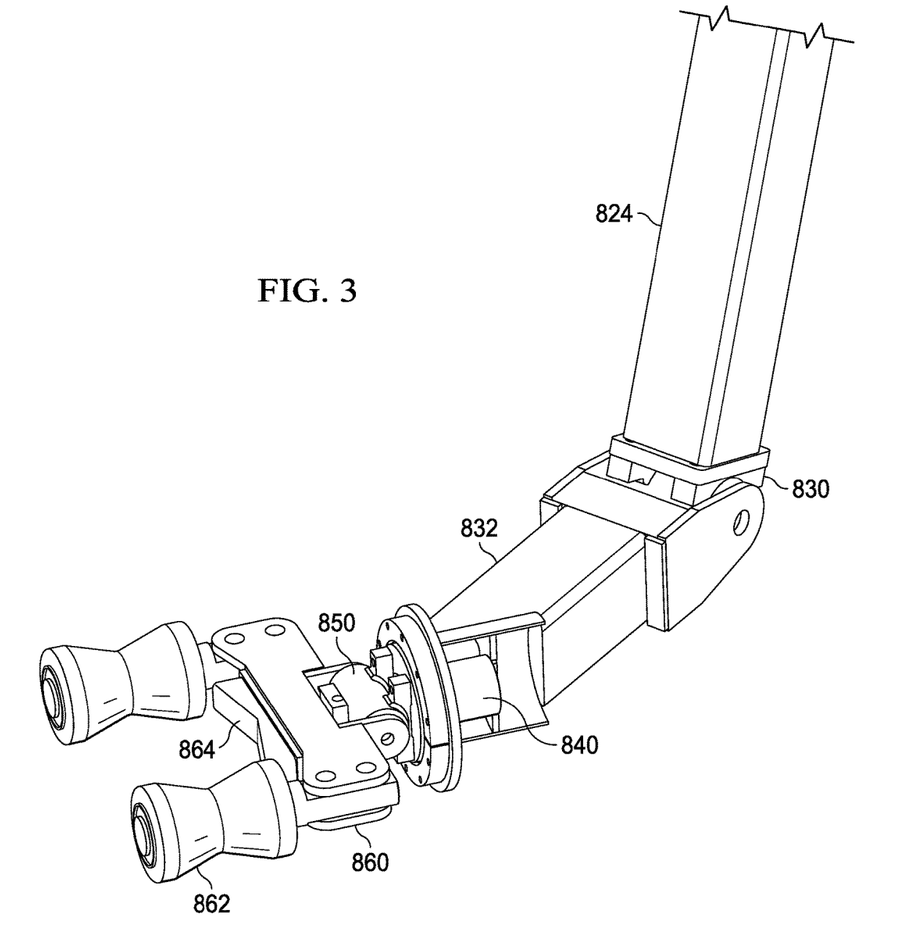
FIG. 3 is an isometric close-up of an embodiment of the pipe engaging end of the lower stabilizing arm.
Figure 4:
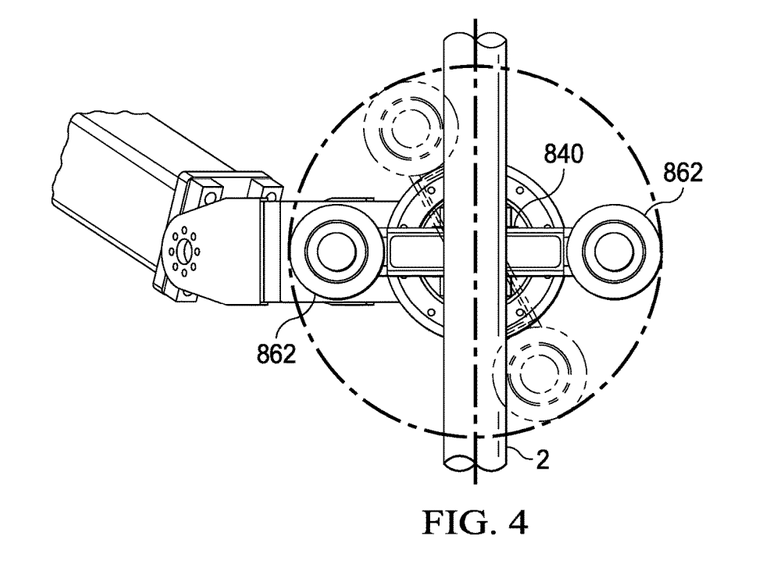
FIG. 4 is a front cutaway view of an embodiment of the lower stabilizing arm, illustrating the action of the fourth rotary actuator to secure and center a drill pipe between the v-shaped rollers.

FIG. 3 is an isometric cut-away close up of the pipe engaging end of lower stabilizing arm 800. FIG. 4 is a front cutaway view of the embodiment of FIG. 3, illustrating the path of v-shaped rollers 862 upon operation of fourth rotary actuator 840 to secure a drill pipe 2 between v-shaped rollers 862.

Figure 5:
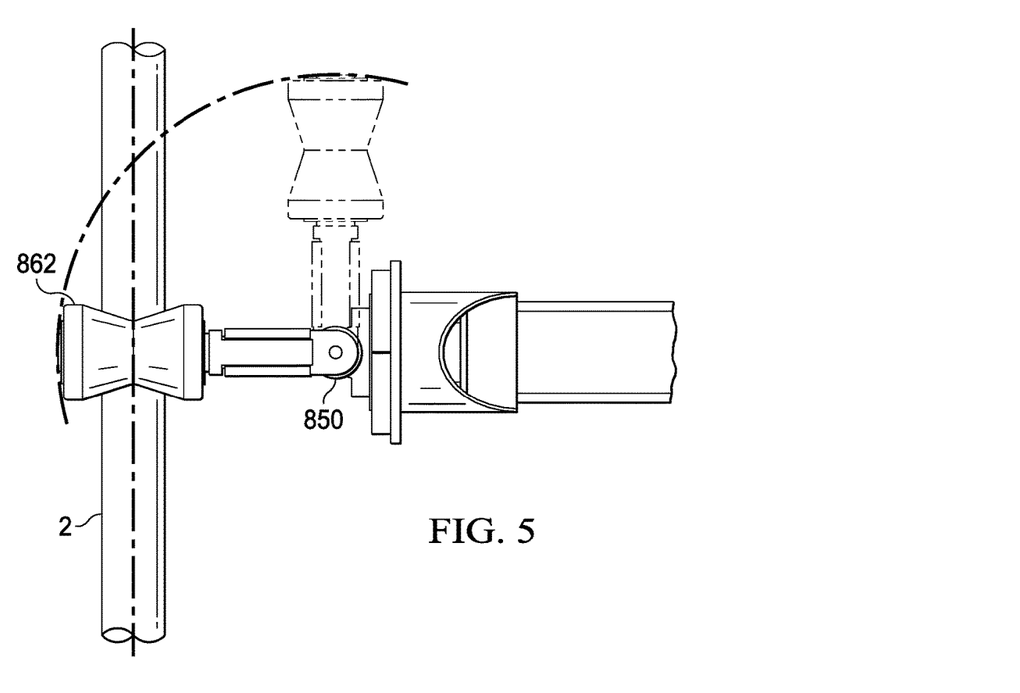
FIG. 5 is a side cutaway view of the embodiment of the lower stabilizing arm, illustrating the action of the fifth rotary actuator to release a drill pipe from between the v-shaped rollers.

FIG. 5 is a side cutaway view of an embodiment of lower stabilizing arm 800, illustrating the path of v-shaped rollers 862 upon operation of fifth rotary actuator 850 to release drill pipe 2 from between v-shaped rollers 862.

Figure 6:
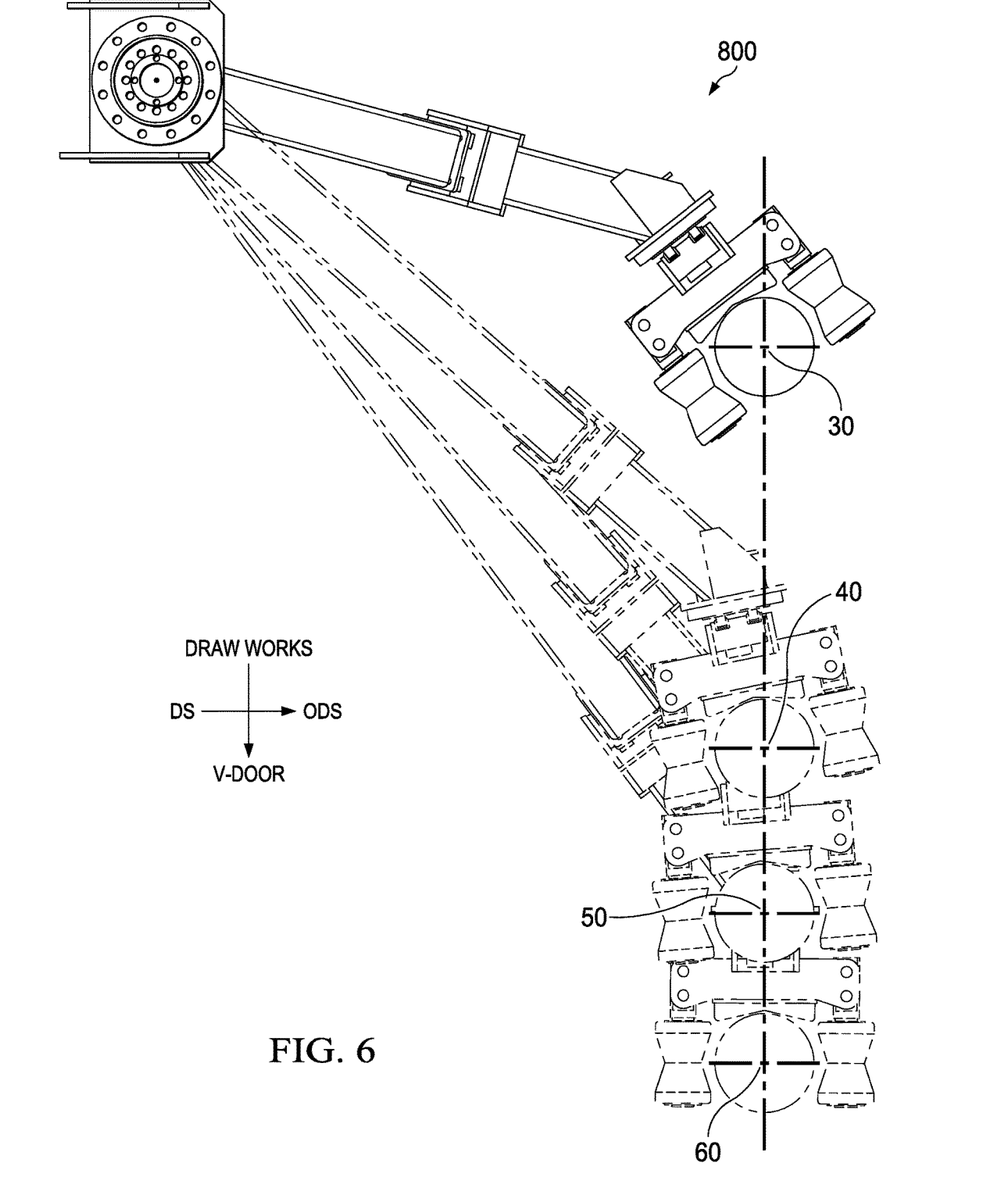
FIG. 6 is a top view of an embodiment of the lower stabilizing arm, illustrating the capability of the lower stabilizing arm to stabilize a stand of drill pipe for stabbing or positioning in four critical locations.
Figure 7:
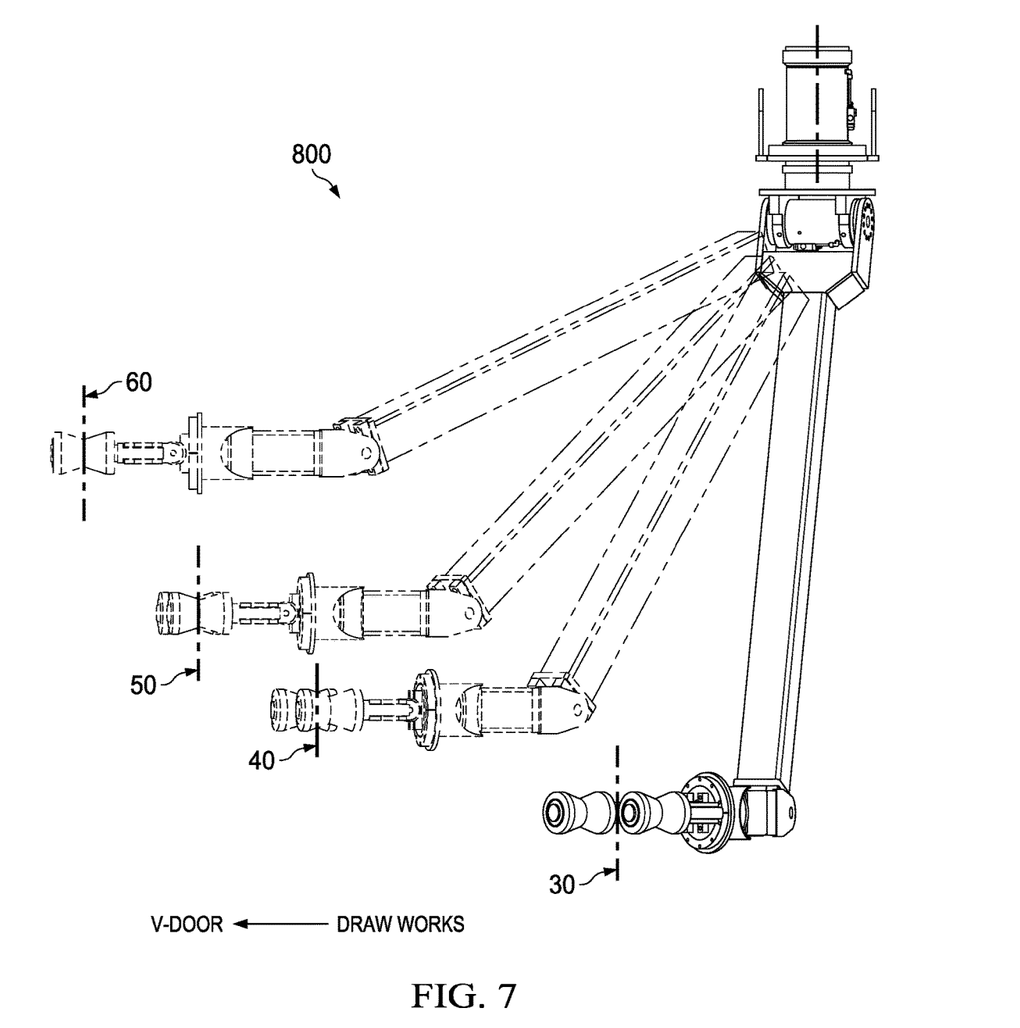
FIG. 7 is a top view of an embodiment of the lower stabilizing arm, illustrating the change in vertical positioning as the lower stabilizing arm relocates between stand locating positions, while maintaining a horizontal inclination.

FIG. 6 is a top view of an embodiment of lower stabilizing arm 800, illustrating the capability of lower stabilizing arm 800 to locate v-shaped rollers 862 to stabilize and position a lower end of stand of drill pipe 2 for stabbing or other positioning needed in four critical locations that are formed in line; well center 30, mousehole 40, stand hand-off position 50, and catwalk 60.

FIG. 7 is a side view of an embodiment of lower stabilizing arm 800, shown from the off-driller's side such that the V-door is on the left and draw works on the right. FIG. 7 illustrates the change in vertical positioning that occurs as lower stabilizing arm 800 relocates between the drill pipe 2 locating positions well center 30, mousehole 40, stand hand-off position 50, and catwalk 60, and further illustrates the ability of lower stabilizing arm 800 to move drill pipe 2 between the various positions while maintaining a horizontal inclination of lower arm 832 by coordinated r of second rotary actuator 820 and third rotary actuator 830 (See FIG. 1). By this method, lower stabilizing arm 800 is properly located and positioned without the need for an extendible member.

Figure 8:
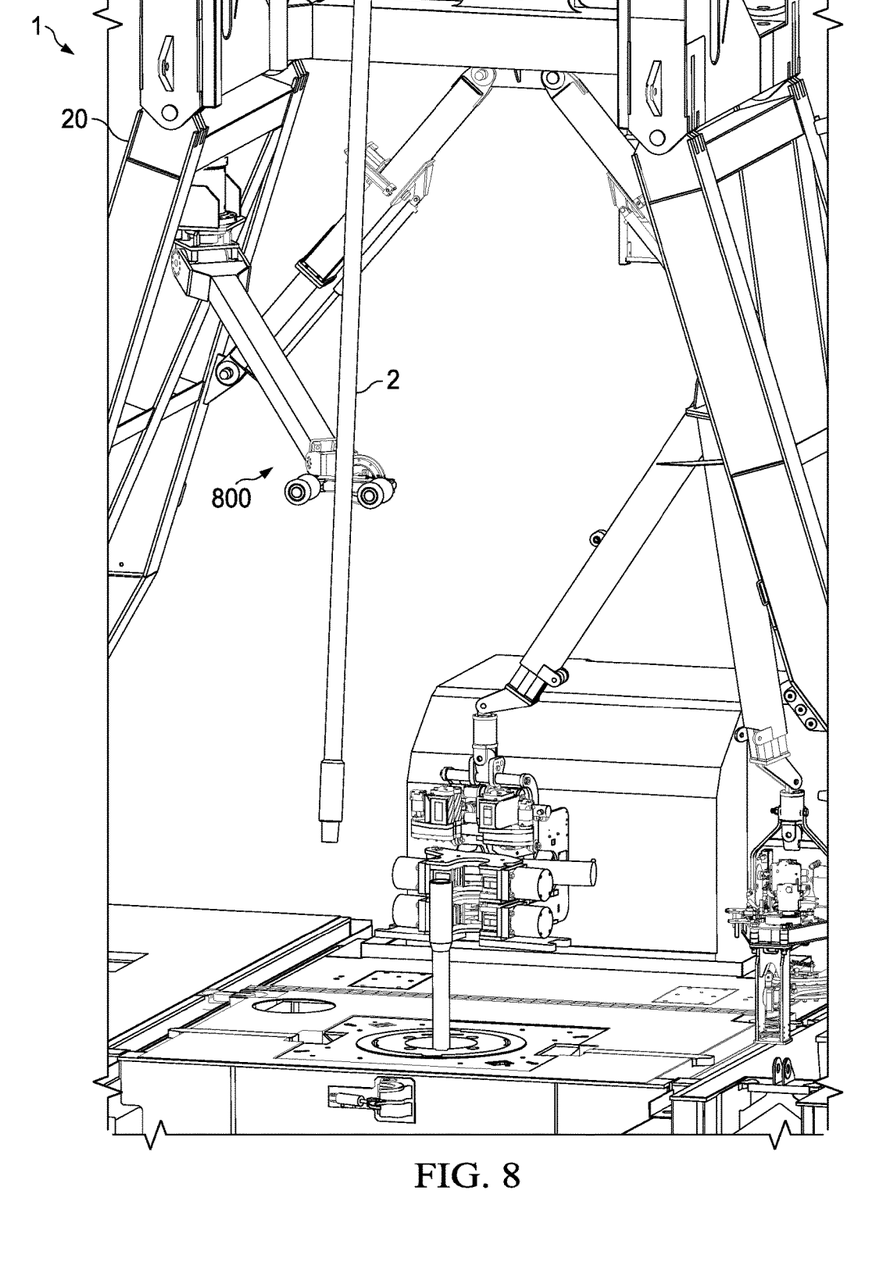
FIG. 8 is an isometric view of an embodiment of the lower stabilizing arm, illustrating the lower stabilizing arm capturing the lower end of a stand of drill pipe from the catwalk.

FIG. 8 is an isometric view of an embodiment of lower stabilizing arm 800, illustrating lower stabilizing arm 800 capturing the lower end of drill pipe section 2 from a catwalk 600 (not shown) on a drilling rig 1. In the embodiment illustrated, lower stabilizing arm 800 is mounted to the lower mast section legs 20 of drilling rig 1.

Figure 9:
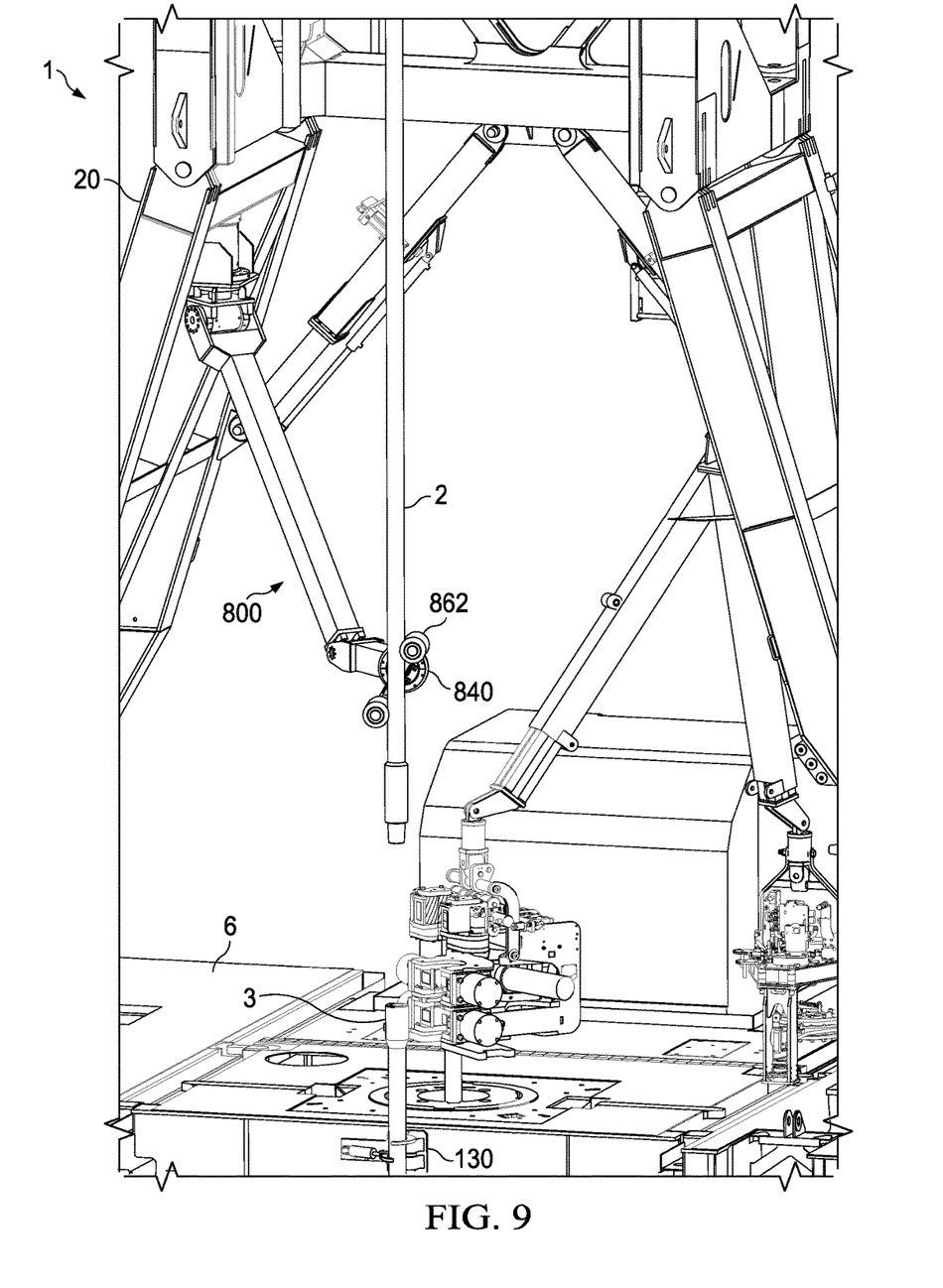
FIG. 9 an isometric view of the lower stabilizing arm, illustrating the lower stabilizing arm secured to the lower end of a stand of drill pipe and stabbing it at the mousehole.

FIG. 9 an isometric view of an embodiment of lower stabilizing arm 800, illustrating lower stabilizing arm 800 secured to the lower end of drill pipe section 2 and preparing to stab it into the box connection of drill pipe section 3 located in mousehole 40. In FIG. 9, drill pipe section 3 is secured below the drill floor 6 by an intermediate stand constraint 130.

Figure 10:
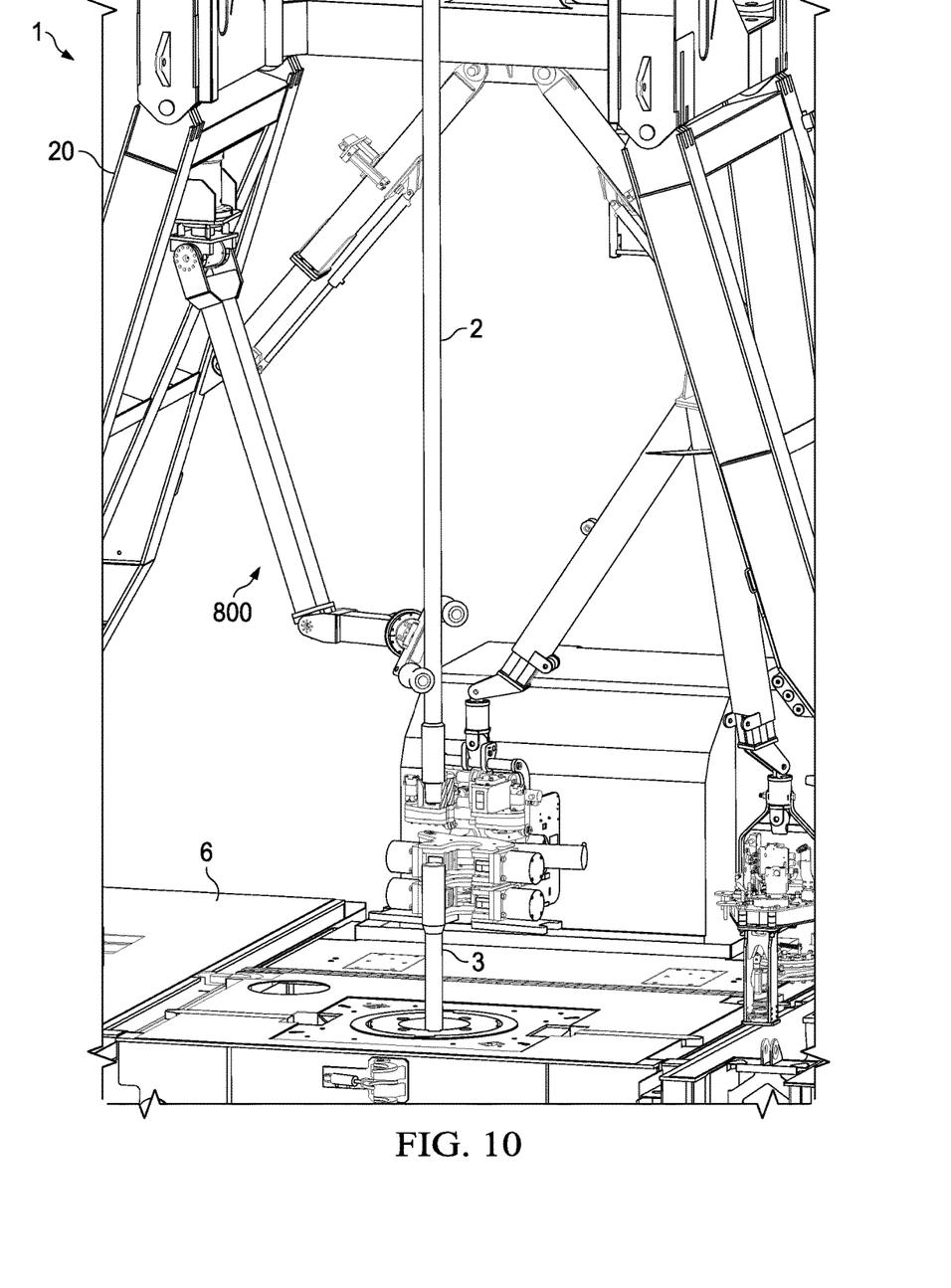
FIG. 10 is an isometric view of the lower stabilizing arm, illustrating the lower stabilizing arm secured to the lower end of a stand of drill pipe and stabbing it at the well center.

FIG. 10 is an isometric view of an embodiment of lower stabilizing arm 800, illustrating lower stabilizing arm 800 secured to the lower end of drill pipe stand 2 and preparing to stab it into the upper box connection of drill string 3 located at well center 40.

Figure 11:
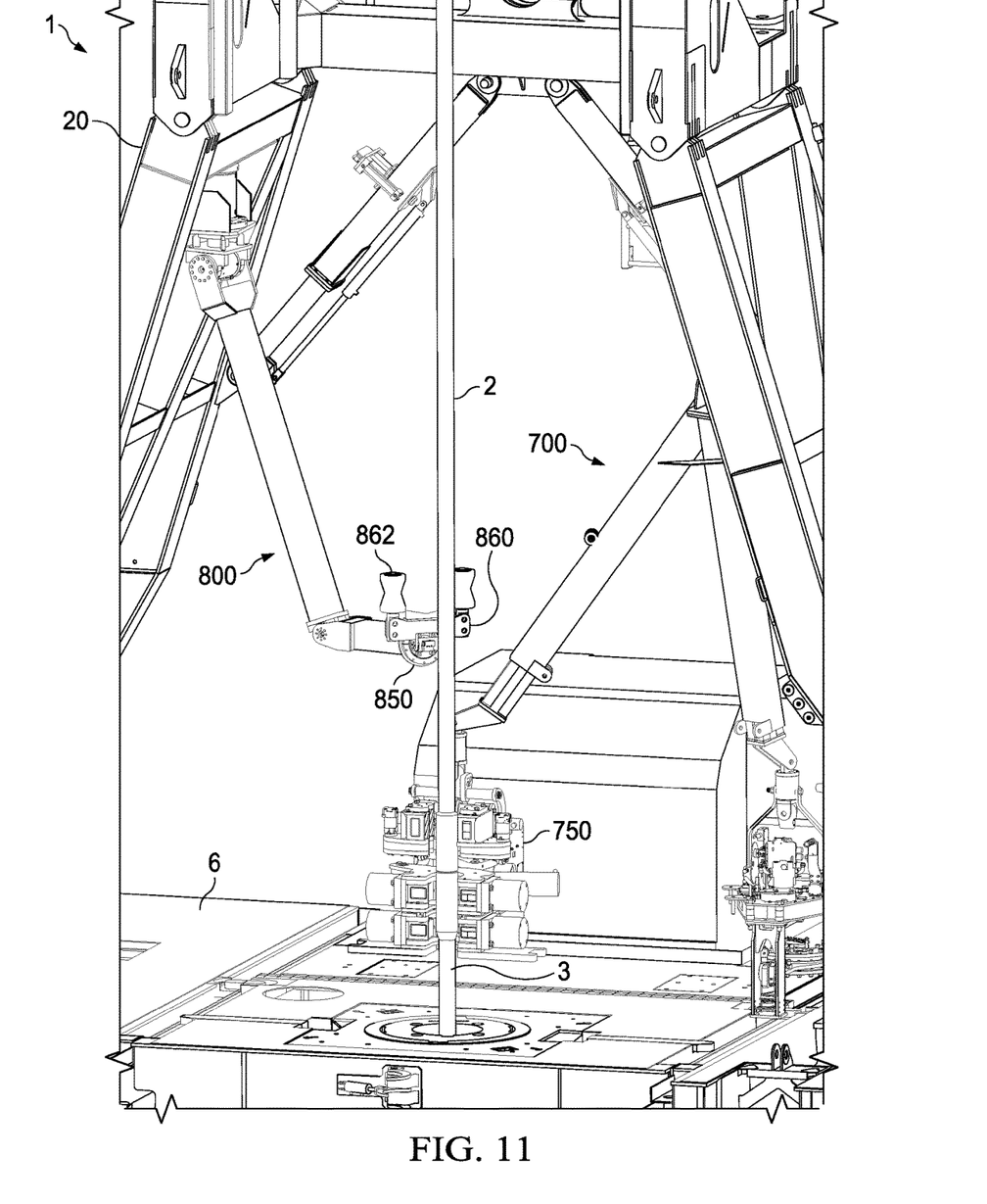
FIG. 11 an isometric view of the lower stabilizing arm, illustrating the lower stabilizing arm disengaging from the lower end of a stand of drill pipe stabbed at the well center.

FIG. 11 an isometric view of an embodiment of lower stabilizing arm 800, illustrating lower stabilizing arm 800 disengaging from the lower end of drill pipe stand 2 which has been successfully stabbed into the upper box connection of drill string 3 located at well center 40. Referring back to FIG. 4, rotational release of v-shaped rollers 862 from pipe stand 2 is achieved by operation of fourth rotary actuator 840. Referring back to FIG. 5, vertical removal of v-shaped rollers 862 from pipe stand 2 is achieved by operation of fifth rotary actuator 850.

It has thus been illustrated that the presently disclosed lower stabilizing arm 800 provides a machine that is capable of handling the lower end of drill pipe 2, including drill collars and whether singles or in stand lengths, to safely permit accelerated movement of drill pipe 2 into and out of a wellbore for the purpose of reducing trip time or to eliminate exposure of a worker at the drill floor level. Lower stabilizing arm 800 provides a means for locating the pin end of a hoisted drilling tubular 2 into alignment with a box end 3 of another for stabbing, or for other positional requirements such as racking or mousehole insertion. Lower stabilizing arm 800 can accurately position drill pipe 2 at the center of a wellbore 30, a mousehole 40, and a stand hand-off position 50 of drilling rig 1.

If used herein, the term "substantially" is intended for construction as meaning "more so than not."

Having thus described the various embodiments, it is noted that the embodiments disclosed are illustrative rather than limiting in nature and that a wide range of variations, modifications, changes, and substitutions are contemplated in the foregoing disclosure and, in some instances, some features may be employed without a corresponding use of the other features. Many such variations and modifications may be considered desirable by those skilled in the art based upon a review of the foregoing description of embodiments. Accordingly, it is appropriate that the appended claims be construed broadly and in a manner consistent with the scope of the disclosure.

The invention claimed is:

1. A lower stabilizing arm (800) for a drilling rig, comprising:
   a bracket (802);
   an upper arm (824) having an upper end (826) and a lower end (828);
   an upper pair of axially opposed rotary actuators (810, 820) connecting the upper end (826) of the upper arm (824) to the bracket (802);
   a lower arm (832) having an upper end (834) and a lower end (836);
   a central rotary actuator (830) connected between the lower end (828) of the upper arm (824) and the upper end (834) of the lower arm (832);
   a roller bracket (860);
   a lower pair of axially opposed rotary actuators (840, 850) connecting the lower end (836) of the lower arm (832) to the roller bracket (860); and,
   a pair of v shaped rollers (862) mounted on the roller bracket (860).

2. The lower stabilizing arm of claim 1, further comprising:
   an obtuse angular bend disposed on the lower arm.

3. The lower stabilizing arm of claim 1, further comprising:
   wherein the upper pair of axially opposed rotary actuators and the central rotary actuator can be operated to position the v shaped rollers over center of each of a wellbore, a mousehole, and a stand hand-off position of a drilling rig.

4. A lower stabilizing arm (800) for a drilling rig, comprising:
   a series of five rotational actuators (810, 820, 830, 840, 850) located on the length of the lower stabilizing arm (800);
   a roller bracket (860) located on a distal end of the arm (800); and,
   a pair of rollers (862) mounted on the roller bracket (860).

5. The lower stabilizing arm of claim 4, further comprising:
   an obtuse angular bend disposed on the lower arm.

6. A lower stabilizing arm (800) for a drilling rig, comprising:
   a bracket (802);
   an upper arm (824) having an upper end (826) and a lower end (828);
   a first rotary actuator (810) mounted on the bracket (802);
   a first actuator coupling (815) connecting the first rotary actuator (810) to a second rotary actuator (820) between the upper end (826) of the upper arm (824) and the bracket (802);
   a lower arm (832) having an upper end (834) and a lower end (836);
   a third rotary actuator (830) connected between the lower end (828) of the upper arm (824) and the upper end (834) of the lower arm (832);
   a fourth rotary actuator (840) connected to the lower end (836) of the lower arm (832);
   a second actuator coupling (845) connecting the fourth rotary actuator (840) to a fifth rotary actuator (850);
   a roller bracket (860) connected to the fifth rotary actuator (850); and,
   a pair of v shaped rollers (862) mounted on the roller bracket (860).

7. The lower stabilizing arm of claim 6, further comprising:
   wherein actuation of the fourth rotary actuator spins the v shaped rollers on an axis centralized on a drill pipe for engaging a lower end of the drill pipe.

8. The lower stabilizing arm of claim 6, further comprising:
   wherein actuation of the fifth rotary actuator moves the v shaped rollers between an axis perpendicular to a drill pipe and an axis generally parallel to a drill pipe.

9. The lower stabilizing arm of claim 6, further comprising:
   cooperative rotation of the second rotary actuator and the third rotary actuator extends the lower arm while maintaining a horizontal inclination of the lower arm.

* * * * *